(12) United States Patent
Jennings et al.

(10) Patent No.: US 6,556,761 B1
(45) Date of Patent: Apr. 29, 2003

(54) SHELF DETECTION SYSTEM FOR A FIBER DISTRIBUTION FRAME

(75) Inventors: Mark R. Jennings, Handover, NJ (US); Frank S. Leone, Berkeley Heights, NJ (US); Richard Pimpinella, Hampton, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/676,177

(22) Filed: Sep. 29, 2000

(51) Int. Cl.$^7$ .............................. G02B 6/00; H01R 3/00
(52) U.S. Cl. ..................... 385/134; 439/489; 439/491
(58) Field of Search ..................... 385/134, 39, 47; 439/488, 489, 490, 491

(56) References Cited

U.S. PATENT DOCUMENTS

| | | | |
|---|---|---|---|
| 4,160,973 A | | 7/1979 | Berlin, Jr. ..................... 345/13 |
| 4,492,504 A | * | 1/1985 | Hainsworth ................. 414/273 |
| 4,925,402 A | * | 5/1990 | Inaba et al. ................. 439/490 |
| 5,498,118 A | * | 3/1996 | Nakahara ............... 414/416.03 |
| 5,883,998 A | * | 3/1999 | Stevens et al. ............. 385/134 |
| 6,031,798 A | * | 2/2000 | James et al. ............. 369/30.28 |
| 6,222,975 B1 | * | 4/2001 | Gilbert et al. .............. 385/134 |
| 6,236,795 B1 | * | 5/2001 | Rodgers ..................... 385/134 |
| 6,263,136 B1 | * | 7/2001 | Jennings et al. ............. 385/48 |

OTHER PUBLICATIONS

Blundell, Barry G. et al., "Volumetric Three–Dimensional Display Systems", Chapter 1, "Volumetric Systems and the Process of Visualization" (pp. 1–7), Chapter 2, "Basic Considerations on Volumetric Display Units", (pp. 29–71), Chapter 5, "Swept–Volume Display Unit Development", (pp. 93–133), "Hybrid Display Unit", (pp. 295–301), References, pp. 316–327—No Dates.

* cited by examiner

Primary Examiner—Tulsidas Patel
(74) Attorney, Agent, or Firm—Gibbons, Del Deo, Dolan, Griffinger & Vecchione

(57) ABSTRACT

The location and type of equipment shelf installed in an optical fiber distribution frame is detected and transmitted to a software management system automatically. A plurality of photo transceivers, arrayed on the frame, detects encoded indicia on each shelf. The coded information is inventoried into a database and displayed in a virtual graphical representation of the frame.

20 Claims, 2 Drawing Sheets

SHELF DETECTION SYSTEM FOR A FIBER DISTRIBUTION FRAME

FIELD OF THE INVENTION

This invention relates to the field of telecommunications, and more particularly to a system to automatically detect the placement and nature of equipment shelves within an optical fiber distribution frame.

BACKGROUND OF THE INVENTION

Many telecommunications applications utilize an optical fiber network of interconnected optical fiber cables to enable optical communications between network locations. Ordinarily, a unique fiber routing will be required to transmit light pulses between network locations. Over this unique route, light pulses may be propagated across several different fibers. At each transition from one fiber to another, individual fibers are connected, thereby enabling light pulses to be carried between a first fiber and a second fiber. In many cases, such as at a central office for the communications system, large numbers of fiber connections must be made and a fiber administration system is employed to manage the various connections.

In many fiber administration systems, as the optical fibers in a network enter the central office, they are directed into an optical fiber distribution frame (FDF) where the individual optical fibers are terminated in an organized manner. Such fiber administration systems are exemplified by the LGX® fiber administration system that is currently manufactured by Lucent Technologies of Murray Hill, N.J., the assignee herein.

The FDF accommodates the placement and management of optical jumpers for interconnecting or cross connecting optical transmission equipment and outside plant (OSP) fibers. The FDF typically includes an upright structural framework or support member having a space or bay within the support member to hold racks or shelves of terminal equipment. Such shelves will be of varying sizes (height) and the terminal equipment will be directed to various functions.

In many cases, OSP is now managed by the fiber administration system with a software management system. The system is configured to provide a graphical representation of the shelves on the FDF, using a graphical user interface (GUI) with a computer (controller). The graphical representation shows what kinds of shelves are installed, where in the FDF each shelf is placed, and the specifications of each shelf. The specifications of the shelves include, but are not limited to, what fiber terminates at what location, what kinds of connectors are used, and an identification of a user/carrier for a given fiber.

In the current art, data from which the controller and the GUI determine and provide virtual images of the shelves are manually added to the system by the user, typically based upon feedback from the service technician who installed the equipment. It is possible to provide the virtual placement, or functional identity, for the shelf incorrectly. In that event, the graphical representation of the FDF would not accurately display the actual shelf placement in the field. Furthermore, there is often a time lag between the installation of the shelves and the updating of the graphical representation.

Accordingly, there is a need to provide a shelf detection system that will automatically detect the placement and nature of equipment shelves within an optical fiber distribution frame.

There is a further need to provide a shelf detection system of the type described and that will synchronize the virtual representation with the actual placement of the shelf within the FDF.

There is a still further need to provide a shelf detection system of the type described and that does not require shutting down and restarting of the computer system every time a shelf is added, thus enabling a "plug and play" procedure.

There is a yet further need to provide a shelf detection system of the type described and that is simple, reliable, and accurate.

SUMMARY OF THE INVENTION

In accordance with the present invention, there is provided a shelf detection system for a fiber distribution frame, for use in connection with a controller. The shelf detection system comprises an upright support member extending between upper and lower ends, and at least one shelf releasably mounted on the upright support member at a selected location.

In an illustrative embodiment, a plurality of photo transceivers are spaced apart uniformly along the upright support member. The photo transceivers are connected to the controller. An optically reflective surface is disposed on the shelf. The optically reflective surface is in optical alignment with one of the photo transceivers when the shelf is mounted on the upright support member. Thus, the shelf location will be transmitted to the controller.

The optically reflective surface further comprises encoded indicia detectable by the photo transceivers. The encoded indicia include encoded specifications of the shelf upon which the optically reflective surface is disposed. Upon mounting the shelf on the upright support member, one or more of the photo transceivers will detect the shelf and transmit the specifications of the shelf to the controller.

BRIEF DESCRIPTION OF THE DRAWING

A more complete understanding of the present invention may be obtained from consideration of the following description in conjunction with the drawing, in which.

DESCRIPTION OF THE PREFERRED EMBODIMENTS

Figure 1:
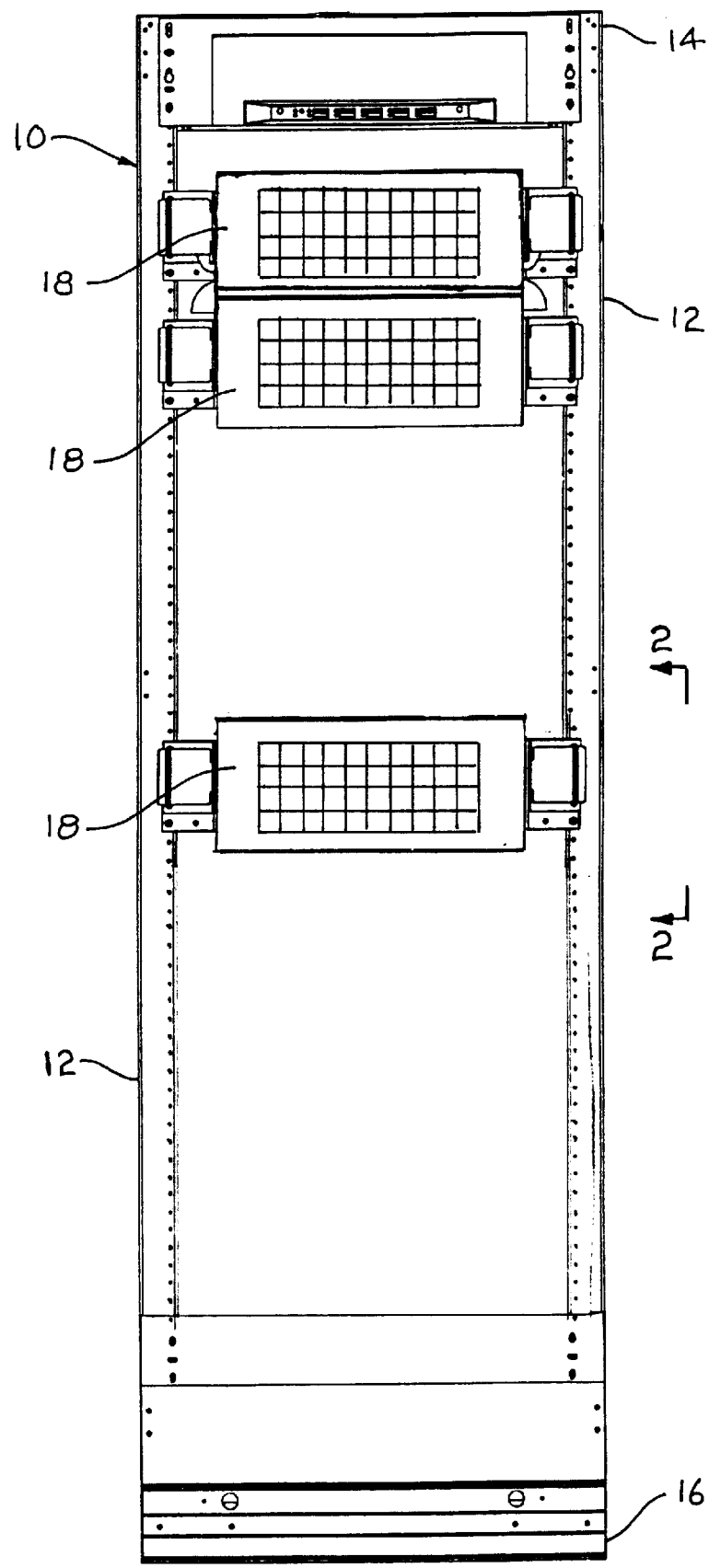
FIG. 1 is a front elevational view of an optical fiber distribution frame with several equipment shelves in place.

Referring now to the drawings, and especially to FIG. 1, a fiber distribution frame 10 has an upright support member 12 extending between upper 14 and lower 16 ends. At least one equipment shelf 18, and typically several shelves 18, are releasably mounted on the upright support member 10 at selected locations.

Figure 2:
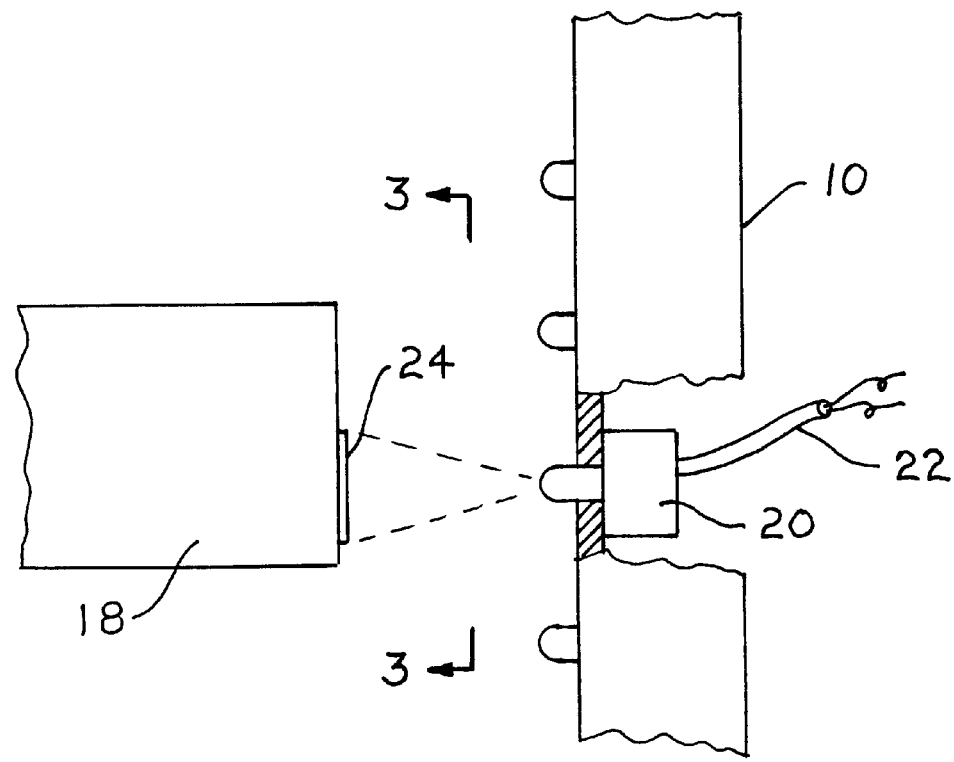
FIG. 2 is a side elevational partially cut-away view of the optical fiber distribution frame of FIG. 1, taken along lines 2—2 of FIG. 1, and showing an equipment shelf and a shelf detection system constructed in accordance with the invention.

Turning now to FIG. 2 as well as FIG. 1, a plurality of detectors 20 are spaced apart uniformly along the upright support member 12. For an illustrative embodiment of the invention, the detectors 20 will be implemented as photo transceivers, and the remainder of the discussion of FIG. 2 will be focused on the use of such photo transceivers. However, it should be understood that the function of the detectors can be realized in a variety of implementations are, including pressure sensitive transducers, resisted transducers, push-button activated switches, making electrically coded contacts and bar-code detection systems. These and similar detection arrangements which will be apparent to those skilled in the art of the invention are intended to be within the scope of the disclosed and claimed invention.

The photo transceiver detectors 20 can be of any type, and typically include light-emitting diode transceivers, infrared light transceivers, and laser transceivers. The photo transceivers 20 are connected to the controller (not shown) by conductors 22.

Figure 3:
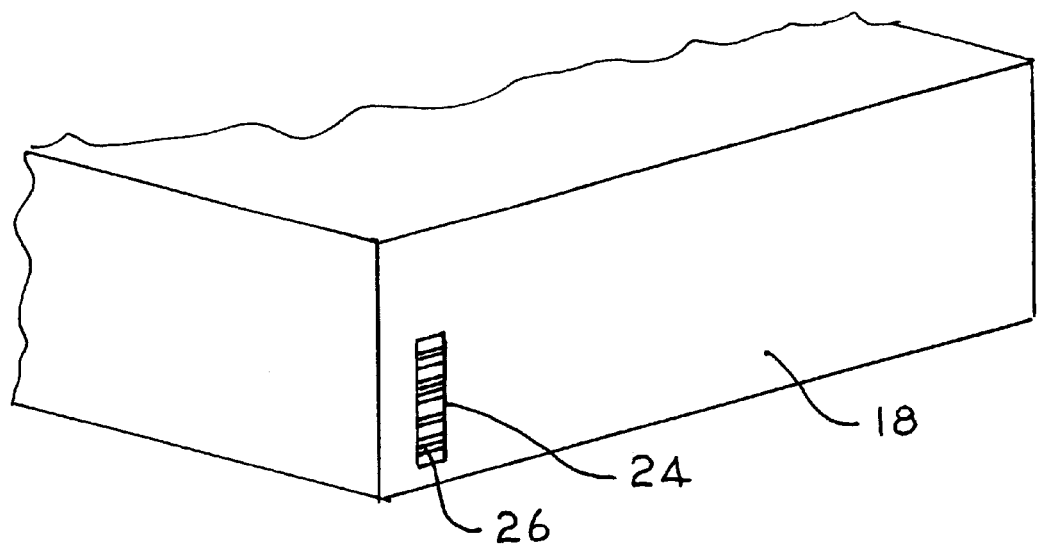
FIG. 3 is an isometric view of the equipment shelf of FIG. 2, taken along lines 3—3 of FIG. 2.

Referring now to FIG. 3, as well as FIGS. 1 and 2, an optically reflective surface 24 is disposed on the shelf 18. (It should be understood that optically reflective surface 24 is associated with the photo transceiver implementation of this illustrative embodiment, and that other manifestations of the detector function of the invention might involve other media disposed on the shelf for communication with the detector.) The optically reflective surface 24 is in optical alignment with one of the photo transceivers 20 when the shelf 18 is mounted on the upright support member 10. The optically reflective surface 24 may also incorporate encoded indicia 26 detectable by the photo transceivers 20. Such encoded indicia 26 may include encoded specifications of the shelf 18 upon which the optically reflective surface 24 is disposed. The encoded indicia 26 may be in the form of a bar code, or any optically readable code. Thus, upon mounting the shelf 18 on the upright support member 10, one of the photo transceivers 20 will detect the shelf 18 and transmit the location and specifications of the shelf 18 to the controller.

According to the invention, a method is disclosed for shelf detection in a fiber distribution frame. The method is for use in connection with a controller, as described above. The method comprises the steps of; extending an upright support member 10 between upper 14 and lower 16 ends; mounting at least one shelf 18 releasably in a selected location on the upright support member 10; mounting a plurality of detectors 20 on the upright support member 10; spacing the detectors 20 apart, preferably uniformly, along the upright support member 10; connecting the detectors 20 to the controller; mounting a detectable medium 24 on the shelf 18; aligning the detectable medium 24 so as to being communication with one of the detectors 20 when the shelf 18 is mounted on the upright support member 10; detecting the shelf 18 location with the detector 20; and transmitting the shelf 18 location from the detector 20 to the controller.

In a further embodiment, the method of the invention includes the incorporation of encoded indicia 26 with the detectable medium 24; providing, within the encoded indicia 26, encoded specifications of the shelf 18 upon which the detectable medium 24 is disposed; detecting the encoded indicia 26 by the detector 20; and transmitting the specifications of the shelf from the detector 20 to the controller.

In a still further embodiment, the method of the invention includes providing a bar code as the encoded indicia.

For a yet further embodiment, the method of the invention includes providing light-emitting diode transceivers, infrared light transceivers, or laser transceivers as the detectors.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which will come within the scope of the appended claims is reserved.

What is claimed:

1. A shelf detection system for a fiber distribution frame comprising:

an upright support member extending between upper and lower ends;

at least one shelf releasably mounted on the upright support member at a selected location;

a plurality of detectors spaced apart along the upright support member, the detectors being operatively linked with a controller associated with the fiber distribution frame; and a medium detectable by ones of the detectors disposed on the shelf and arranged to be within a detection field of a proximately located detector when the shelf is mounted on the upright support member;

wherein a detection of the detectable medium by the proximally located detector is communicated to the controller and translated thereby to a location in the fiber distribution frame for the shelf.

2. The shelf detection system of claim 1, wherein the detectors are implemented as photo transceivers and the detectable medium is implemented as an optically reflective surface, and wherein the optically reflective surface disposed on a shelf is brought into optical alignment with a proximately located photo transceiver when the shelf is mounted on the upright support member.

3. The shelf detection system of claim 1, wherein the detectable medium further comprises encoded indicia detectable by the detectors, the encoded indicia including encoded specifications of the shelf upon which the detectable medium is disposed, so that upon mounting the shelf on the upright support member, one of the detectors will detect the shelf and transmit the specifications of the shelf to the controller.

4. The shelf detection system of claim 3, wherein the encoded indicia include a bar code.

5. The shelf detection system of claim 2, wherein the photo transceivers include light-emitting diode transceivers.

6. The shelf detection system of claim 2, wherein the photo transceivers include infrared light transceivers.

7. The shelf detection system of claim 2, wherein the photo transceivers include laser transceivers.

8. A shelf detection system for a fiber distribution frame comprising:

an upright support member extending between upper and lower ends;

at least one shelf releasably mounted on the upright support member at a selected location;

a plurality of detectors spaced apart along the upright support member, the detectors being operatively linked with a controller associated with the fiber distribution frame; and a medium detectable by ones of the detectors disposed on the shelf and arranged to be within a detection field of a proximately located detector when the shelf is mounted on the upright support member;

wherein the detectable medium includes encoded specification of the shelf upon which the detectable medium is disposed and a detection of the detectable medium by the proximately located detector is communicated to the controller and translated thereby to a location of the shelf in the fiber distribution frame and a specification for the shelf.

9. The shelf detection system of claim 8, wherein the encoded indicia include a bar code.

10. The shelf detection system of claim 8, wherein the detectors are implemented as photo transceivers and the detectable medium is implemented as an optically reflective surface, and wherein the optically reflective surface disposed on a shelf is brought into optical alignment with a proximately located photo transceiver when the shelf is mounted on the upright support member.

11. The shelf detection system of claim 10, wherein the photo transceivers include light-emitting diode transceivers.

12. The shelf detection system of claim 10, wherein the photo transceivers include infrared light transceivers.

13. The shelf detection system of claim 10, wherein the photo transceivers include laser transceivers.

14. A method of shelf detection for a fiber distribution frame, for use in connection with a controller, the method comprising the steps of:

extending an upright support member between upper and lower ends;

mounting at least one shelf releasably in a selected location on the upright support member;

mounting a plurality of detectors on the upright support member;

spacing the detectors apart along the upright support member;

connecting the detectors to the controller;

mounting a detectable medium on the shelf;

causing the detectable medium to be aligned with a proximately located detector when the shelf is mounted on the upright support member;

in response to a detection of the detectable medium by the proximally located detector, communicating that detection to the controller and causing the controller to translate the detection to a location in the fiber distribution frame for the shelf.

15. The shelf detection method of claim 14, further comprising the steps of:

providing encoded indicia on the detection medium providing, within the encoded indicia, encoded specifications of the shelf upon which the detection medium is disposed;

detecting the encoded indicia by the detector; and transmitting the detected indicia from the detector to the controller.

16. The shelf detection method of claim 15, further comprising the step of providing a bar code as the encoded indicia.

17. The shelf detection method of claim 14, wherein the detectors are implemented as photo transceivers and the detectable medium is implemented as an optically reflective surface, and wherein the optically reflective surface disposed on a shelf is brought into optical alignment with a proximately located photo transceiver when the shelf is mounted on the upright support member.

18. The shelf detection method of claim 17, further comprising the step of providing light-emitting diode transceivers as the photo transceivers.

19. The shelf detection method of claim 17, further comprising the step of providing infrared light transceivers as the photo transceivers.

20. The shelf detection method of claim 17, further comprising the step of providing laser transceivers as the photo transceivers.

\* \* \* \* \*